(12) United States Patent
Uemura

(10) Patent No.: US 8,818,266 B2
(45) Date of Patent: Aug. 26, 2014

(54) COMMUNICATION APPARATUS, CONTROL METHOD, AND STORAGE MEDIUM

(75) Inventor: Hidetaka Uemura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 12/481,837

(22) Filed: Jun. 10, 2009

(65) Prior Publication Data

US 2009/0318079 A1 Dec. 24, 2009

(30) Foreign Application Priority Data

Jun. 20, 2008 (JP) ................................. 2008-162305

(51) Int. Cl.
  H04B 5/00 (2006.01)
  H04B 7/00 (2006.01)
  H04B 5/02 (2006.01)
(52) U.S. Cl.
  CPC ............... *H04B 5/02* (2013.01); *H04B 5/0031* (2013.01)
  USPC .......................... 455/41.1; 455/41.2; 455/66.1
(58) Field of Classification Search
  CPC ...... H04B 5/00; H04B 5/0075; H04B 5/0025; H04B 5/0043; H04B 17/0072
  USPC ........................ 455/39, 41.1, 41.2, 41.3, 66.1
  See application file for complete search history.

(56) References Cited

U.S. PATENT DOCUMENTS

| 7,460,827 | B2 * | 12/2008 | Schuster et al. | 455/2.01 |
| 7,864,742 | B2 * | 1/2011 | Bennett | 370/338 |
| 7,965,673 | B2 * | 6/2011 | Iwamura | 370/328 |
| 2005/0105498 | A1 * | 5/2005 | Hardacker et al. | 370/338 |
| 2008/0248751 | A1 * | 10/2008 | Pirzada et al. | 455/41.2 |
| 2009/0040183 | A1 * | 2/2009 | Buehler et al. | 345/168 |
| 2009/0163139 | A1 * | 6/2009 | Wright-Riley | 455/39 |
| 2009/0264070 | A1 * | 10/2009 | Lim | 455/41.2 |
| 2010/0048126 | A1 * | 2/2010 | Nishiyama | 455/41.1 |

FOREIGN PATENT DOCUMENTS

JP 7-141537 A 6/1995

* cited by examiner

*Primary Examiner* — Andrew Wendell
(74) *Attorney, Agent, or Firm* — Carter, DeLuca, Farrell & Schmidt, LLP

(57) ABSTRACT

A communication apparatus includes a communication unit capable of establishing communication with and transmitting data to an external apparatus without being brought into physical contact with the external apparatus and determines whether the communication apparatus is in physical contact with the external apparatus. The communication apparatus allows data to be transmitted to the external apparatus using a first transmission method if communication with the external apparatus has been established and it is determined that the communication apparatus is in physical contact with the external apparatus.

11 Claims, 7 Drawing Sheets

0
COMMUNICATION APPARATUS, CONTROL METHOD, AND STORAGE MEDIUM

BACKGROUND OF THE INVENTION

1. Field of the Invention

The present invention relates to a technology in which data is transmitted by bringing devices close to each other to establish communication between the devices.

2. Description of the Related Art

In recent years, systems have been developed which utilize close proximity wireless communication. In close proximity communication, communication is performed using an induced electric field etc. within a maximum allowable communication distance (hereinafter, called a communication range) of from several centimeters to several tens of centimeters. This technology has a high-speed transmission capability and is unlikely to influence other wireless systems because it is exclusively used for short distance communication. Hence, the technology is appropriate for use in data communication between devices, requiring no connection cable therebetween.

For instance, a technology is known in which, when a card having an antenna housed therein is brought close to a communication target device, information in the card is transmitted to the communication target device using radio waves (Japanese Patent Laid-Open No. 07-141537).

Not limited to a card, a technology is also known at present in which data communication is performed when a communication apparatus such as a cellular phone is brought close to another device.

Since close proximity wireless communication allows a device to perform communication without being in physical contact with a communication partner, a user sometimes brings a device close to a communication partner while holding the device by hand without making the device physically contact the communication partner.

However, when a large amount of data, such as image data, is to be transmitted, it often takes a long time to transmit the data. In this case, the user has to keep holding the device for a long time, causing a burden on the user.

SUMMARY OF THE INVENTION

The present invention is directed to overcome the above-described drawbacks and disadvantages.

According to an aspect of the present invention, there is provided a communication apparatus including a close proximity wireless communication unit configured to be capable of establishing communication with and transmitting data to an external apparatus without physical contact with the external apparatus by being brought to within a predetermined distance from the external apparatus, a determination unit configured to determine whether the communication apparatus is in physical contact with the external apparatus, and a control unit configured to control the communication apparatus in such a manner that data is allowed to be transmitted to the external apparatus using a first transmission method if communication with the external apparatus has been established and the determination unit has determined that the communication apparatus is in physical contact with the external apparatus, and data is not allowed to be transmitted to the external apparatus using the first transmission method if communication with the external apparatus has been established and the determination unit has determined that the communication apparatus is not in physical contact with the external apparatus.

According to another aspect of the present invention, there is provided a method of controlling a communication apparatus including the steps of establishing close proximity wireless communication with and transmitting data to an external apparatus without making the communication apparatus physically contact the external apparatus in accordance with the communication apparatus being brought to within a predetermined distance from the external apparatus; determining whether the communication apparatus is in physical contact with the external apparatus; and controlling the communication apparatus in such a manner that data is allowed to be transmitted to the external apparatus using a first transmission method if communication with the external apparatus has been established and it is determined that the communication apparatus is in physical contact with the external apparatus, and data is not allowed to be transmitted to the external apparatus using the first transmission method if communication with the external apparatus has been established and it is determined that the communication apparatus is not in physical contact with the external apparatus.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the present invention.

DESCRIPTION OF THE EMBODIMENTS

Exemplary embodiments, features and aspects of the present invention will now be described in detail below with reference to the attached drawings.

Hereinafter, embodiments are described in which the present invention is applied to a digital video camera (DVC), which is an example of an imaging apparatus, and to a system including a storage apparatus, which is an example of an information processing apparatus.

First Embodiment

Figure 1:
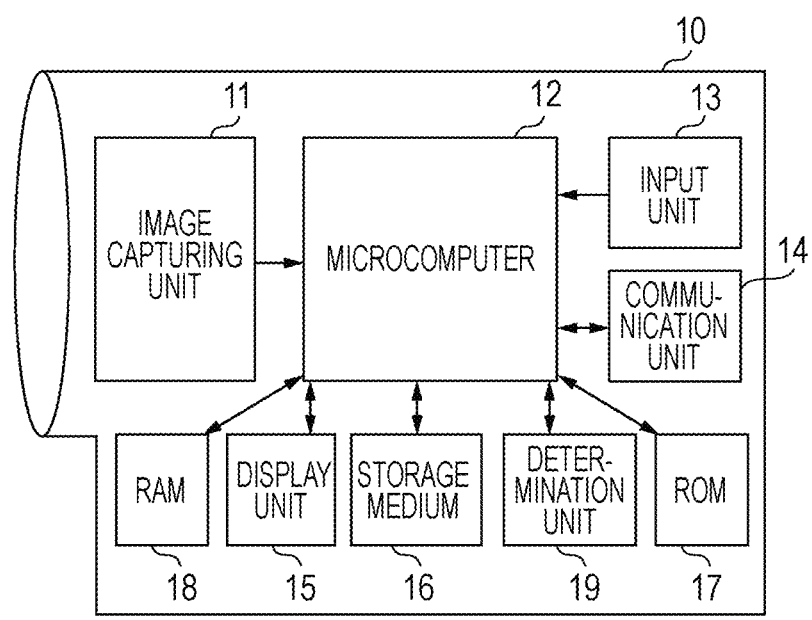
FIG. 1 is a block diagram of a digital video camera (DVC) according to a first embodiment of the invention.

FIG. 1 is a block diagram showing a configuration of a DVC according to a first embodiment. An image capturing unit 11 of a DVC 10 obtains images of objects and includes lenses, sensors, etc. Images of objects obtained by this unit undergo image processing, whereby image data is produced.

A microcomputer 12 controls the entire DVC 10 on the basis of signals input from respective units and on the basis of programs. Note that the control process of the entire apparatus may be performed by a single hardware unit, or by two or more hardware units that share the process and function as one control unit.

An input unit 13 includes operation members for receiving user operations. The input unit 13 may employ a button, a lever, a touch sensor, a rotating wheel, or the like. The input unit 13 in the present embodiment includes a power button for switching a power source on/off, a photo button for giving an instruction to take a still image, a REC button for giving an instruction to take a movie, a zoom key for zooming, etc. The input unit 13 further includes a direct print button for giving an instruction to print captured image data, a play button for giving an instruction to play back captured image data, REW and FF buttons for respectively rewinding and fast-forwarding a taken movie.

A communication unit 14 is a communication interface for performing close proximity wireless communication, and includes an internal antenna. The communication unit 14, when brought close to a communication unit of an external apparatus, starts close proximity contactless communication.

A display unit 15 is a device for displaying captured image data or various graphical user interfaces (GUIs), and may be a liquid crystal display (LCD), for example. The display data may also be output to other display devices.

A storage medium 16 is a medium for storing captured image data. The storage medium 16 may be housed in the DVC 10 or may be a removable medium such as a memory card. The image data is usually compressed by a microcomputer 12 and stored in the form of an image file.

A ROM 17 stores programs and setting values for performing control.

A RAM 18 temporarily stores parameters and the like.

A determination unit 19 determines whether or not the DVC 10 is in physical contact with a storage apparatus when communication has been established. The determination may be made using two or more methods, which will be described later.

The configuration of the DVC 10 has been described above. Hereinafter, the present embodiment will be described using an example in which data are sent/received by using close proximity wireless communication.

Figure 2:
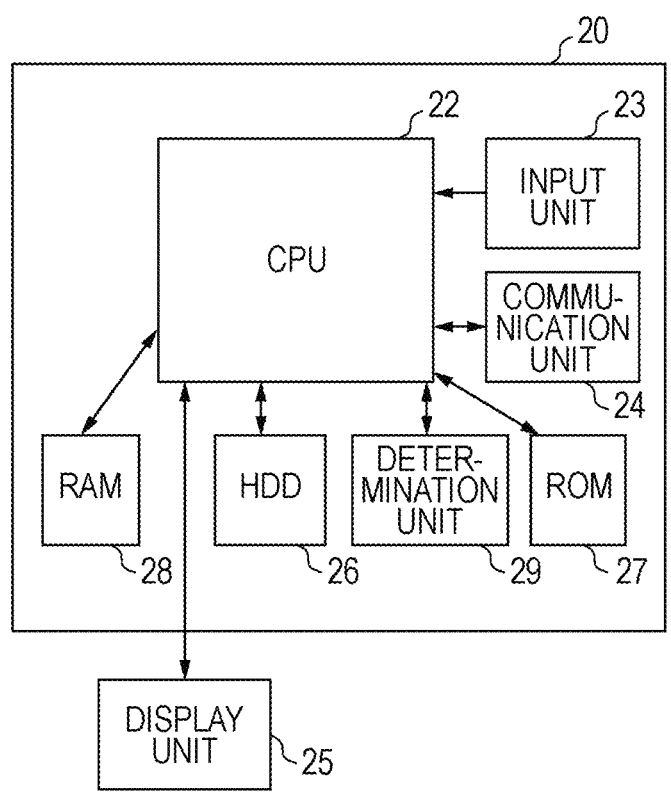
FIG. 2 is a block diagram of a storage apparatus according to the first embodiment.

FIG. 2 shows a configuration of a storage apparatus according to the present embodiment.

A CPU 22 controls the entirety of a storage apparatus 20 on the basis of signals input from respective units and on the basis of programs. The control process of the entire apparatus may be performed by a single hardware unit, or by two or more hardware units that share the process and function as one control unit.

An input unit 23 includes operation members for receiving operations from a user. Examples of the operation members include a button and a touch panel. An interface for receiving instructions form a remote control etc. may also be provided.

A hard disk (HDD) 26 is a storage medium for storing various data.

A display unit 25 displays data played back by the storage apparatus 20. The display unit 25 may be a display device provided in the storage apparatus 20, or a display device or a TV that can be connected to the storage apparatus 20 using a cable.

A communication unit 24, a ROM 27, a RAM 28, and a determination unit 29 function similarly to those in the DVC 10, and hence, their descriptions are omitted.

There are two methods of transmitting image data in the present embodiment. The first is streaming and the second is copying. Copying of image data in the present embodiment means a process of creating a copy of image data stored in the storage medium 16 of the DVC 10 as is, i.e., in a compressed form and on an image-data-file-by-image-data-file basis, and transmitting the copy to the storage apparatus 20. On the other hand, streaming of image data means a process of decompressing image data stored in the storage medium 16 of the DVC 10, and generating stream data, which is sequentially transmitted to the storage apparatus 20, followed by a process of sequentially playing back the stream data while receiving the data, performed by the storage apparatus 20. Streaming is mainly used for the transmission of movie data. In general, the time taken to finish transmission processing is longer in streaming than in copying, since streaming requires an additional process of decompressing the compressed data performed by the DVC 10.

Figure 3A:
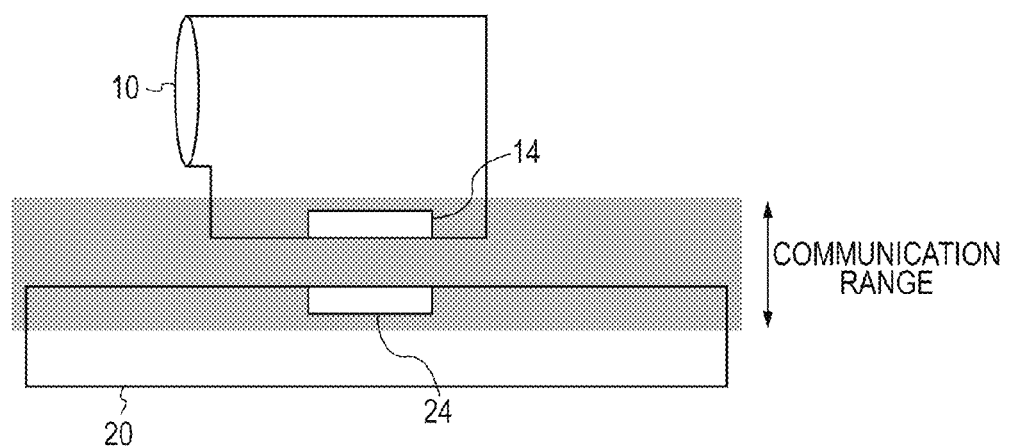
FIGS. 3A and 3B are schematic diagrams showing close proximity wireless communication according to the first embodiment.
Figure 3B:
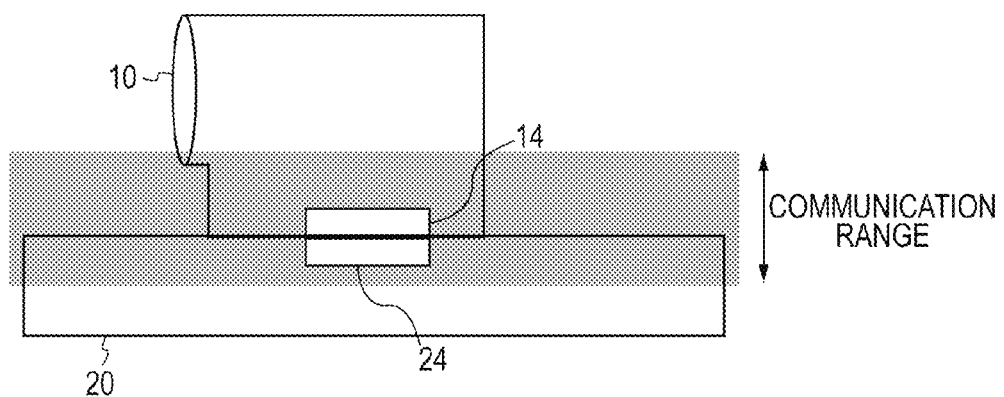

FIGS. 3A and 3B are schematic diagrams showing close proximity wireless communication performed by the DVC 10 and the storage apparatus 20. Close proximity wireless communication is communication performed by devices that are brought to within a predetermined communication range of each other. Usually, communication is performed within a small distance from each other, ranging from several centimeters to several tens of centimeters, depending on a frequency band used. When the communication unit 14 of the DVC 10 and the communication unit 24 of the storage apparatus 20 come close to each other so as to be within a predetermined distance from each other, electromotive force is generated. By detecting this electromotive force, the DVC 10 and the storage apparatus 20 start a process of establishing communication between them. On the other hand, when the communication units 14 and 24 are apart from each other beyond a communication range, communication cannot be performed because of insufficient strength of electromotive force.

Note that close proximity wireless communication is possible as long as devices are within a communication range, irrespective of whether or not the devices are in physical contact with each other. For instance, communication is possible either in a state in which devices are not in physical contact with each other as shown in FIG. 3A or in a state in which the devices are in physical contact with each other as shown in FIG. 3B. Hereinafter, the state in which devices are within a communication range and in physical contact with each other is called a "contact communication state", and the state in which devices are within a communication range and not in physical contact with each other is called a "non-contact communication state".

In the non-contact communication state shown in FIG. 3A, a user has to keep holding the DVC 10 by hand, whereas in the contact communication state shown in FIG. 3B, a user need not keep holding the DVC 10 by hand, since the user can place the DVC 10 on the storage apparatus 20. Hence, it is preferable to transmit data in the contact communication state when the time required to perform data transmission processing is long. Here, the time required to perform data transmission processing does not only mean a length of time determined by a transmission speed, but means a length of time as seen from a user's point of view, that is, a length of time from a point when a user gives an instruction to transmit data (or when a user performs an action leading to an instruction to transmit data) to a point when transmission of all the data to be transmitted is completed.

From the above-described viewpoint, time-consuming processing such as streaming in the non-contact communication state is prohibited in the present embodiment. Time-consuming processing is controlled to be allowed only in the contact communication state. Details will be described below.

Figure 4A:
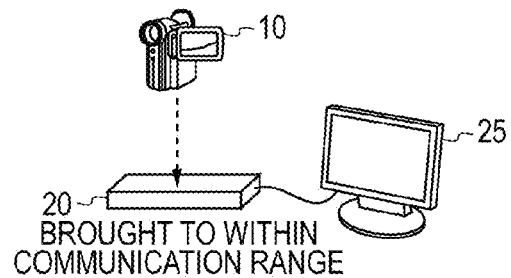
FIGS. 4A to 4C are schematic diagrams showing close proximity wireless communication according to the first embodiment.
Figure 4B:
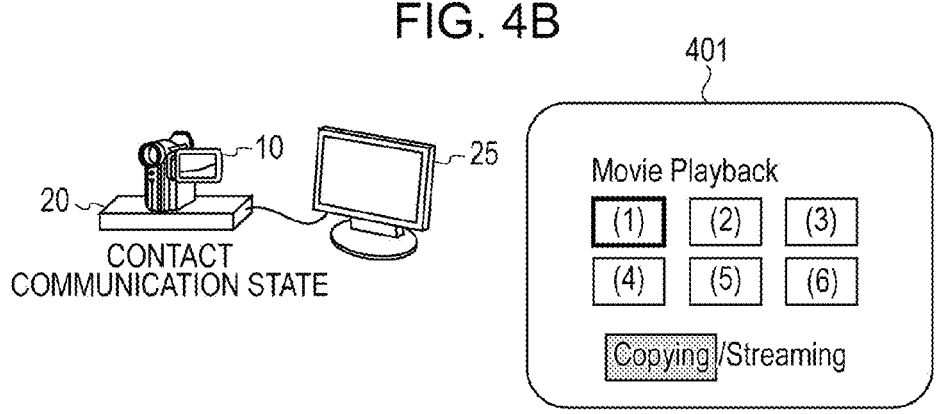
Figure 4C:
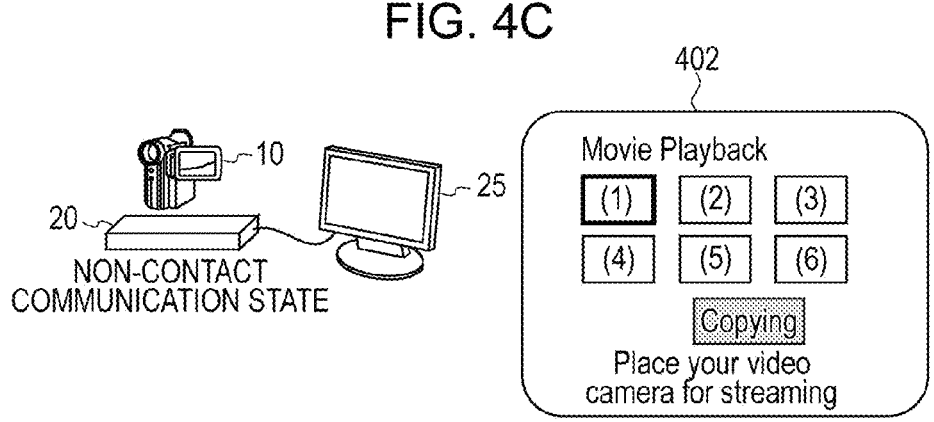

FIGS. 4A to 4C are schematic diagrams showing the case in which data stored in the storage medium 16 of the DVC 10 is transmitted to the storage apparatus 20 in the present embodiment. Here, referring to FIG. 4A, a case is assumed in which a user performs an operation to bring the DVC 10 close to the storage apparatus 20 so as to be within a communication range.

It is assumed in the present embodiment that image data to be transmitted is selected in advance by a user operation, and the DVC 10 holds a list of the IDs of the selected image data.

Referring to FIG. 4B, description is made of the case in which the DVC 10 is placed on the storage apparatus 20 and is in the contact communication state. In this case, the display unit 15 of the DVC 10 displays a screen 401 showing a list of the image data stored in the storage medium 16 of the DVC 10. The screen 401 includes a sub-screen that receives the result of selection as to whether the image data is to be copied to the storage apparatus 20, or to be streamed so as to be displayed on the display unit 25 via the storage apparatus 20. The sub-screen shows an indicator used in giving an instruction to perform copying and an indicator used in giving an instruction to perform streaming. When a user makes the selection through the input unit 13 of the DVC 10, the DVC 10 transmits the image data using the selected transmission method.

Next, referring to FIG. 4C, description is made of the case in which the DVC 10 is not in physical contact with the storage apparatus 20, i.e., both are put in the non-contact communication state. In this case, as in FIG. 4B, the display unit 15 of the DVC 10 displays a screen 402 showing a list of the image data stored in the storage medium 16 of the DVC 10. The screen 402 includes a sub-screen prompting selection as to whether the image data is to be copied to the storage apparatus 20 or not. The sub-screen shows an indicator used in giving an instruction to perform copying. Here, the DVC 10 does not display an indicator used in giving an instruction to perform streaming, and instead notifies a user that streaming is possible by placing the DVC 10 on the storage apparatus 20.

In this manner, a user is prevented from waiting for a time-consuming process such as streaming to finish while the non-contact communications state is maintained.

The present embodiment is configured such that, in the non-contact communication state, streaming is not displayed as an option; however, while displaying streaming as an option, an alert may be given when an operation is performed to select this option, or this option may be displayed as a gray-shaded non-selectable option.

In the present embodiment, a user is assumed to select streaming playback or copying in the contact communication state; however, a user's load for selection operations may be decreased by automatically performing streaming in the contact communication state and automatically performing copying in the non-contact state.

Figure 5:
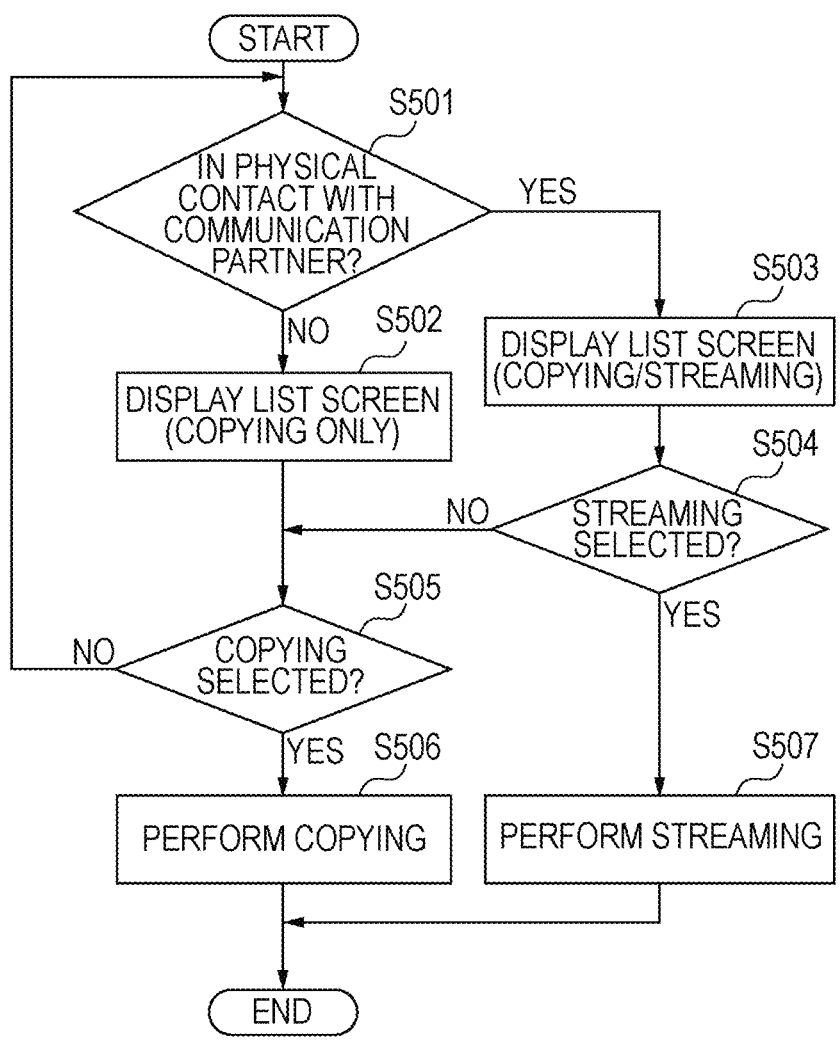
FIG. 5 is a flowchart showing a process according to the first embodiment.

FIG. 5 is a flowchart showing the process of transmitting data to the storage apparatus 20 performed by the DVC 10 according to the present embodiment. The following process is realized in such a manner that the microcomputer 12 of the DVC 10 controls the units of the DVC 10 on the basis of input signals and programs.

The flow starts when communication with the storage apparatus 20 has been established. In step S501, the DVC 10 determines whether or not it is in physical contact with the storage apparatus 20. When it is, the flow proceeds to step S503, and when not, the flow proceeds to step S502.

An acceleration sensor is used as a method of determining whether or not the DVC 10 is in physical contact with the storage apparatus 20. The acceleration sensor is a sensor for detecting movement of the DVC 10, and is usually used to detect hand shake etc. When the DVC 10 is in physical contact with the storage apparatus 20 as shown in FIG. 4B, the DVC 10 does not move significantly. On the other hand, when the DVC 10 is not in physical contact with the storage apparatus 20 as shown in FIG. 4C, movement of the DVC 10 is detected because it is likely that a user is holding the DVC 10 with his/her hand. Hence, when the acceleration sensor shows a predetermined value or above, that is, when a detected amount of movement of the DVC 10 is a predetermined value or above, the DVC 10 determines that it is not in physical contact with the storage apparatus 20. On the other hand, when the detected amount of movement of the DVC 10 is less than a predetermined value, the DVC 10 determines that it is in physical contact with the storage apparatus 20.

In step S502, referring to FIG. 4C, the DVC 10 reads the thumbnails of image data from the storage medium 16 and displays a list of them, as shown in the screen 402. At this time, control is performed such that only copying is selectable as a transmission method and streaming is not selectable.

In step S503, the DVC 10 reads the thumbnails of image data from the storage medium 16 and displays a list of them, as shown in the screen 401. At this time, copying or streaming is allowed to be selected as a transmission method.

In step S504, the DVC 10 determines whether or not streaming has been selected. When it is determined that streaming has been selected, the flow proceeds to step S507, and when not, the flow proceeds to step S505.

In step S507, the DVC 10 transmits image data to the storage apparatus 20 by performing streaming, and the flow ends.

In step S505, the DVC 10 determines whether or not copying has been selected. When it is determined that copying has been selected, the flow proceeds to step S506, and when not, the flow goes back to step S501.

In step S507, the DVC 10 transmits image data to the storage apparatus 20 by performing copying and the flow ends.

In step S501 of the present flowchart, the DVC 10 uses an acceleration sensor to determine whether or not it is in physical contact with the storage apparatus 20; however, other methods may be used for the determination.

For example, by measuring the strength of radio waves between the DVC 10 and the storage apparatus 20, the DVC 10 may determine that it is not in physical contact with the storage apparatus 20 when the strength of the radio waves is less than a predetermined value. This is because the strength of radio waves decreases as the distance between devices increases in close proximity wireless communication.

Alternatively, by providing a pressure sensor on the DVC 10, the DVC 10 may determine that it is in physical contact with the storage medium 16 when it detects a pressure of a predetermined value or higher.

Further, by providing a physical sensor at a point of contact between the DVC 10 and the storage apparatus 20, it may be determined whether or not they are in physical contact with each other.

Further, in conjunction with the above determination methods, a horizontal sensor may be used. Referring to FIG. 3B, a surface of the DVC 10 on which the communication unit 14 is provided is horizontal when the DVC 10 is placed on the storage apparatus 20. Hence, it can be determined whether or not the DVC 10 is placed on the storage apparatus 20, by using the above methods and a horizontal sensor.

As described above, the DVC 10 according to the present embodiment is made so as not to perform streaming when it is determined that the DVC 10 is in the non-contact communication state, and allowed to perform streaming when it is determined that the DVC 10 is in the contact communication state. By this configuration, a user is prevented from performing time-consuming streaming while the non-contact communication state is maintained.

Copying can be performed irrespective of the result of determination as to whether or not the DVC 10 is in physical contact with the storage apparatus 20. By this configuration, a copying process, which needs a relatively short period of time, can be performed only by bringing the DVC 10 close to the storage apparatus 20. As a result, a user can give an instruction to transmit data without performing an operation for making apparatuses strictly contact each other.

Further, usability is increased since a user who is going to perform a time-consuming process is prompted in advance to cause the DVC 10 to physically contact the storage apparatus 20.

Second Embodiment

In the first embodiment, the screens 401 and 402 are displayed on the display unit 15 of the DVC 10; however, these screens may be displayed on the display unit 25 connected to the storage apparatus 20.

In this case, the storage apparatus 20 determines whether or not it is in physical contact with the DVC 10 and determines whether or not streaming is to be performed. This process is described hereinafter. Note that since the second embodiment is similar to the first embodiment, portions which are different from those of the first embodiment will be mainly described, omitting the descriptions of portions which are the same as those of the first embodiment.

Figure 6:
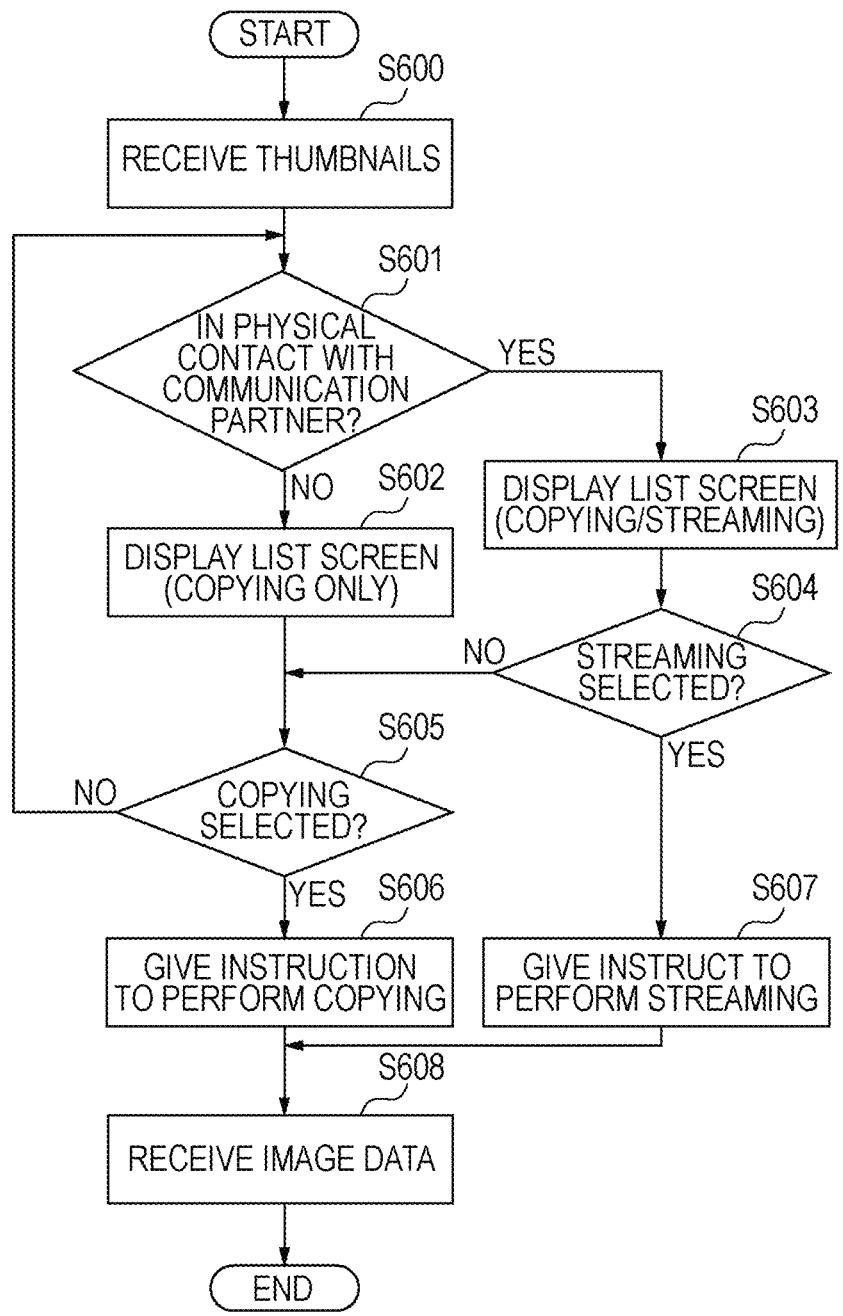
FIG. 6 is a flowchart showing a process according to a second embodiment of the invention.

FIG. 6 is a flowchart showing a process performed by the storage apparatus 20 according to the present embodiment. The following process is realized in such a manner that the CPU 22 of the storage apparatus 20 controls the units of the storage apparatus 20 on the basis of input signals and programs.

The flow starts when communication with the DVC 10 has been established. In step S600, the storage apparatus 20 first requests the DVC 10 to send the thumbnails of data to be transmitted, and receives the thumbnails transmitted from the DVC 10 in response to the request.

In step S601, the storage apparatus 20 determines whether or not the storage apparatus 20 is in physical contact with the DVC 10. When it is determined that the storage apparatus 20 is in physical contact with the DVC 10, the flow proceeds to step S603, and when not, the flow proceeds to step S602.

The methods of determining whether or not the storage apparatus 20 is in physical contact with the DVC 10 may be various methods realized by providing a radio wave strength detector, an applied-pressure sensor, a physical switch, or the like on the storage apparatus 20, as in the DVC 10 of the first embodiment.

In step S602, the storage apparatus 20 displays a list of the received data, as shown in the screen 402 of FIG. 4. At this time, only copying is allowed to be selected as a transmission method, and streaming is forbidden.

In step S603, the storage apparatus 20 displays a list of the received data as shown in the screen 401 of FIG. 4. At this time, copying or streaming is allowed to be selected as a transmission method. The selection result is input by a user through the input unit 23, for example.

In step S604, the storage apparatus 20 determines whether or not streaming has been selected. When it is determined that streaming has been selected, the flow proceeds to step S607, and when not, the flow proceeds to step S605.

In step S607, the storage apparatus 20 transmits an instruction to the DVC 10 to perform streaming. In response to the instruction, the DVC 10 transmits image data to the storage apparatus 20 by performing streaming.

In step S608, the storage apparatus 20 receives the transmitted image data.

In step S605, the storage apparatus 20 determines whether or not copying has been selected. When it is determined that copying has been selected, the flow proceeds to step S606, and when not, the flow goes back to step S601.

In step S607, the storage apparatus 20 transmits an instruction to the DVC 10 to perform copying. In response to this instruction, the DVC 10 transmits image data to the storage apparatus 20 by performing copying.

In step S608, the storage apparatus 20 receives the transmitted image data.

According to the present embodiment, as described above, by causing the display unit 25 of the storage apparatus 20 to display a selection screen, it is also possible to make selection between copying or streaming using the input unit 23. In a data transmission system, there is a case in which the content of a communication process is selected by a receiving party rather than by a sending party. The present embodiment is useful in such a case.

Other Embodiments

In the above embodiments, streaming has been taken as an example of a time-consuming process; however, a time-consuming process is not limited to streaming. For instance, the present invention can be applied to a case in which the DVC 10 periodically transmits still image data at a fixed repetition rate and the display unit 25 displays the image data in a sequence as a slide show. In the process of displaying a slide show, a unit of still image data for each slide is sequentially transmitted at times separated by a predetermined interval, hence it takes a longer time to transmit all the still image data in a slide show than to simply transmit all the still image data. Hence, the DVC 10 may be designed such that a slide show process is prohibited in the non-contact communication state.

Also in the case of copying data from the DVC 10 to the storage apparatus 20, it takes a long time to transmit a large amount of data. Hence, the DVC 10 may determine whether or not the amount of data to be transmitted exceeds a predetermined value and, when it is determined that the amount of data exceeds a predetermined value, prohibit copying unless the DVC 10 determines that it is in physical contact with the storage apparatus 20. The copying may be prohibited by using a method similar to the method used for prohibiting streaming.

Figure 7:
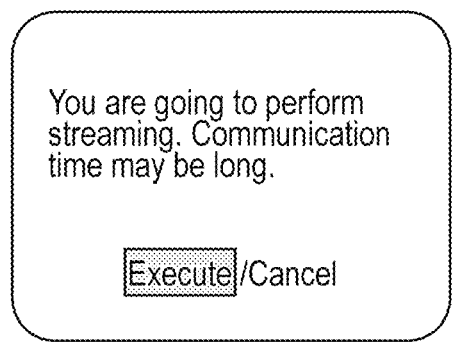
FIG. 7 illustrates a display screen according to another embodiment of the invention.

In the above embodiments, a time-consuming process such as streaming is prohibited in the non-contact communication state; however, a time-consuming process need not always be prohibited. For instance, when streaming or the like is instructed to be performed in the non-contact state, the DVC 10 may notify a user that it will take a long time to perform the process, as shown in FIG. 7. When a user again gives an instruction to perform streaming through a user operation, streaming may be performed.

Each of the embodiments is only an example of the invention, and the embodiments may be appropriately combined with one another.

The present embodiments have been described taking a DVC as an example, but the present invention can be applied to a digital still camera, a cellular phone, an image viewer, etc.

The present invention can also be realized in such a manner that the functions of the DVC or the storage apparatus according to the above-described embodiments are implemented by programs, which are stored in advance in a storage medium such as a ROM, and the DVC reads the programs by having the ROM mounted therein.

In this case, reading and executing the programs realizes the functions according to the above-described embodiments, and hence the programs and the ROM in which the programs are stored also configure the present invention.

The programs that realize the functions of the DVC according to the above-described embodiments may by provided in the form of programs stored in a storage medium. Examples of the storage media which can be used include a semiconductor medium (ROM, nonvolatile memory, etc.), an optical medium (DVD, MO, MD, CD, etc.), and a magnetic medium (magnetic tape, flexible disk, etc). Alternatively, the above-described programs may be provided in such a manner that they are received via a communication network from a server computer that stores the programs in the storage unit thereof.

While the present invention has been described with reference to exemplary embodiments, it is to be understood that the present invention is not limited to the disclosed exemplary embodiments. The scope of the following claims is to be accorded the broadest interpretation so as to encompass all modifications, equivalent structures and functions.

This application claims the benefit of Japanese Patent Application No. 2008-162305 filed Jun. 20, 2008, which is hereby incorporated by reference herein in its entirety.

What is claimed is:

1. A communication apparatus comprising:
a close proximity wireless communication unit configured to be capable of establishing close proximity wireless communication with an external apparatus by being brought to within a predetermined distance from the external apparatus, wherein the close proximity wireless communication unit is able to establish the close proximity wireless communication both in a case where the communication apparatus is in a first state where the communication apparatus is in physical contact with the external apparatus and in a case where the communication apparatus is in a second state where the communication apparatus is not in physical contact with the external apparatus;
a determination unit configured to determine whether the communication apparatus is in the first state or the second state when the close proximity wireless communication is already established; and
a control unit configured to control the communication apparatus in such a manner that data is allowed to be transmitted by the close proximity wireless communication unit to the external apparatus using a first transmission method with the established close proximity wireless communication if the close proximity wireless communication with the external apparatus is already established and the determination unit has determined that the communication apparatus is in the first state, and data is not allowed to be transmitted by the close proximity wireless communication unit to the external apparatus using the first transmission method with the established close proximity wireless communication if the close proximity wireless communication with the external apparatus is already established and the determination unit has determined that the communication apparatus is in the second state.

2. The communication apparatus according to claim 1, wherein the close proximity wireless communication unit is capable of transmitting data using a second transmission method that allows time required for data transmission processing to be shorter than that when using the first transmission method, and
wherein the control unit allows data to be transmitted using the second transmission method irrespective of a determination result of the determination unit.

3. The communication apparatus according to claim 1, wherein the first transmission method is a method of transmitting stream data of a movie to the external apparatus.

4. The communication apparatus according to claim 1, wherein the first transmission method is a method of transmitting still image data periodically to the external apparatus.

5. The communication apparatus according to claim 1, wherein the determination unit determines whether the communication apparatus is in physical contact with the external apparatus by detecting pressure applied to the communication apparatus.

6. The communication apparatus according to claim 1, wherein the determination unit determines whether the communication apparatus is in physical contact with the external apparatus by detecting motion of the communication apparatus.

7. The communication apparatus according to claim 1, wherein the determination unit determines whether the communication apparatus is in physical contact with the external apparatus by detecting strength of radio waves between the communication apparatus and the external apparatus.

8. The communication apparatus according to claim 1, wherein the control unit performs control such that an indicator for giving an instruction to transmit data using the first transmission method is displayed on a display unit if communication with the external apparatus has been established and the determination unit has determined that the communication apparatus is in physical contact with the external apparatus, and
wherein the control unit performs control such that the indicator for giving an instruction to transmit data using the first transmission method is not displayed on the display unit if communication with the external apparatus has been established and the determination unit has determined that the communication apparatus is not in physical contact with the external apparatus.

9. The communication apparatus according to claim 2, wherein a display unit is controlled by the control unit to display an indicator for selecting whether data is to be transmitted using the first or the second transmission method if communication with the external apparatus has been established and the determination unit has determined that the communication apparatus is in physical contact with the external apparatus, and
wherein the display unit is controlled by the control unit to make the indicator not selectable for giving an instruction to transmit data using the first transmission method if communication with the external apparatus has been established and the determination unit has determined that the communication apparatus is not in physical contact with the external apparatus.

10. A method of controlling a communication apparatus comprising:
establishing close proximity wireless communication with an external apparatus in accordance with the communication apparatus being brought to within a predetermined distance from the external apparatus, wherein the close proximity wireless communication is able to be established both in a case where the communication apparatus is in a first state where the communication apparatus is in physical contact with the external apparatus and in a case where the communication apparatus is in a second state where the communication apparatus is not in physical contact with the external apparatus;

determining whether the communication apparatus is in the first state or the second state when the close proximity wireless communication is already established; and controlling the communication apparatus in such a manner that data is allowed to be transmitted to the external apparatus using a first transmission method with the established close proximity wireless communication if the close proximity wireless communication with the external apparatus is already established and it is determined that the communication apparatus is in the first state, and data is not allowed to be transmitted to the external apparatus using the first transmission method if the close proximity wireless communication with the external apparatus is already established and it is determined that the communication apparatus is in the second state.

11. A non-transitory storage medium in which is stored a computer-readable program for causing a computer to execute a method of controlling a communication apparatus comprising:

establishing close proximity wireless communication with an external apparatus in accordance with the communication apparatus being brought to within a predetermined distance from the external apparatus, wherein the close proximity wireless communication is able to be established both in a case where the communication apparatus is in a first state where the communication apparatus is in physical contact with the external apparatus and in a case where the communication apparatus is in a second state where the communication apparatus is not in physical contact with the external apparatus;

determining whether the communication apparatus is in the first state or the second state when the close proximity wireless communication is already established; and controlling the communication apparatus in such a manner that data is allowed to be transmitted to the external apparatus using a first transmission method with the established close proximity wireless communication if the close proximity wireless communication with the external apparatus is already established and it is determined that the communication apparatus is in the first state, and data is not allowed to be transmitted to the external apparatus using the first transmission method with the established close proximity wireless communication if the close proximity wireless communication with the external apparatus is already established and it is determined that the communication apparatus is in the second state.

* * * * *